Sept. 29, 1959   A. O. HOPPER   2,906,466
SYSTEM FOR EXTRACTING LIQUID FROM SOLIDS, SUCH AS METAL CHIPS
Filed Feb. 24, 1955   3 Sheets-Sheet 1
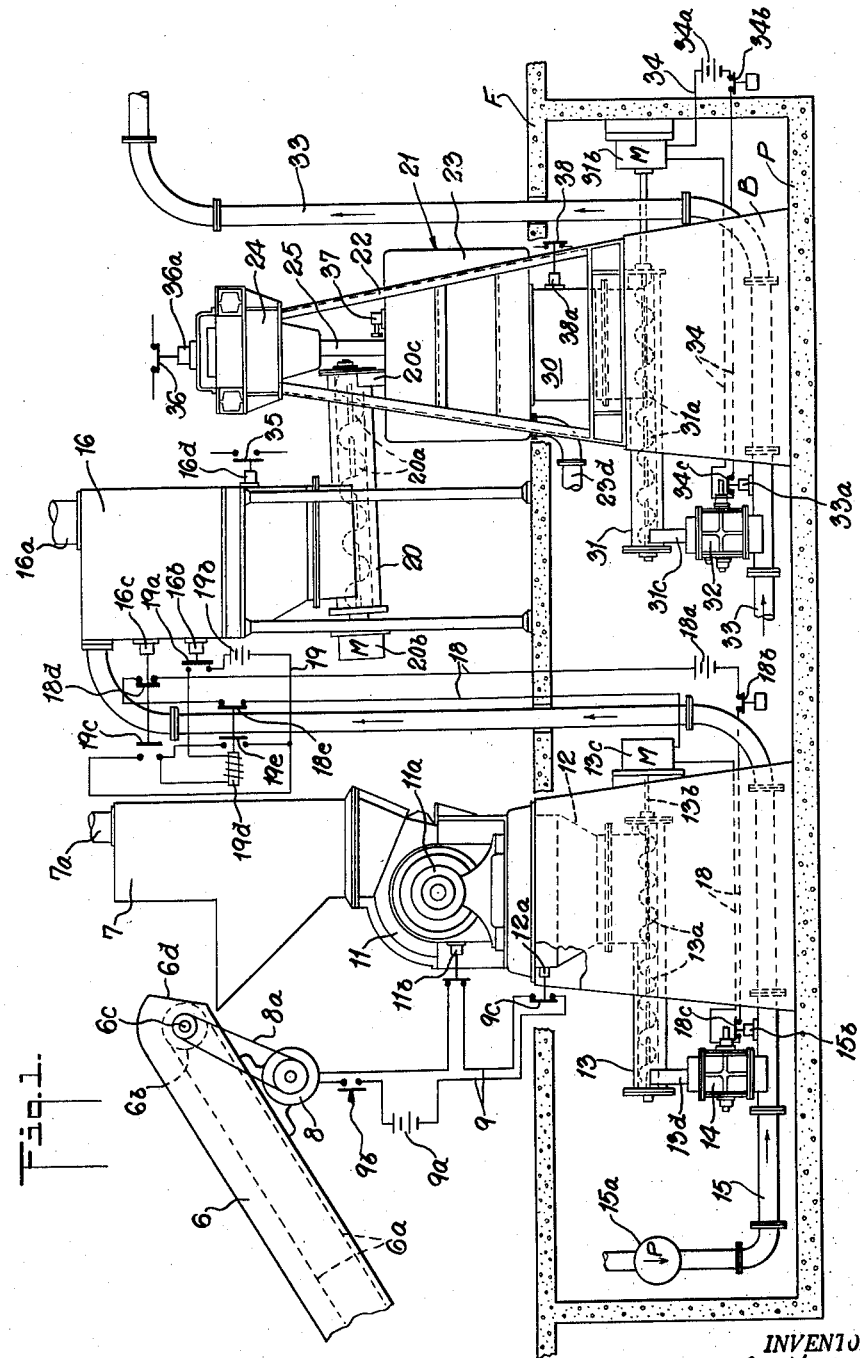
INVENTOR.
ALLEN O. HOPPER
BY
Davis, Hoxie & Faithfull,
ATTORNEYS

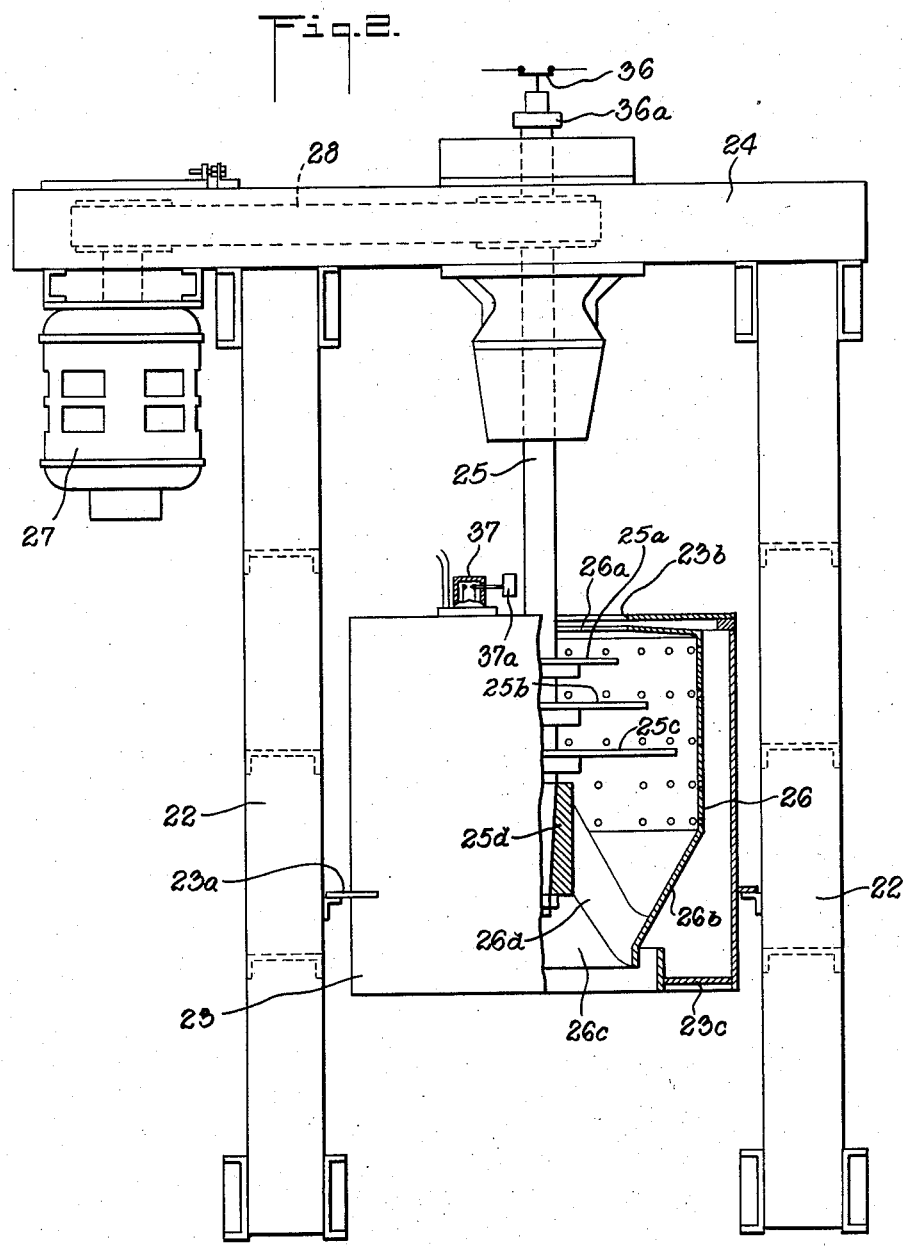

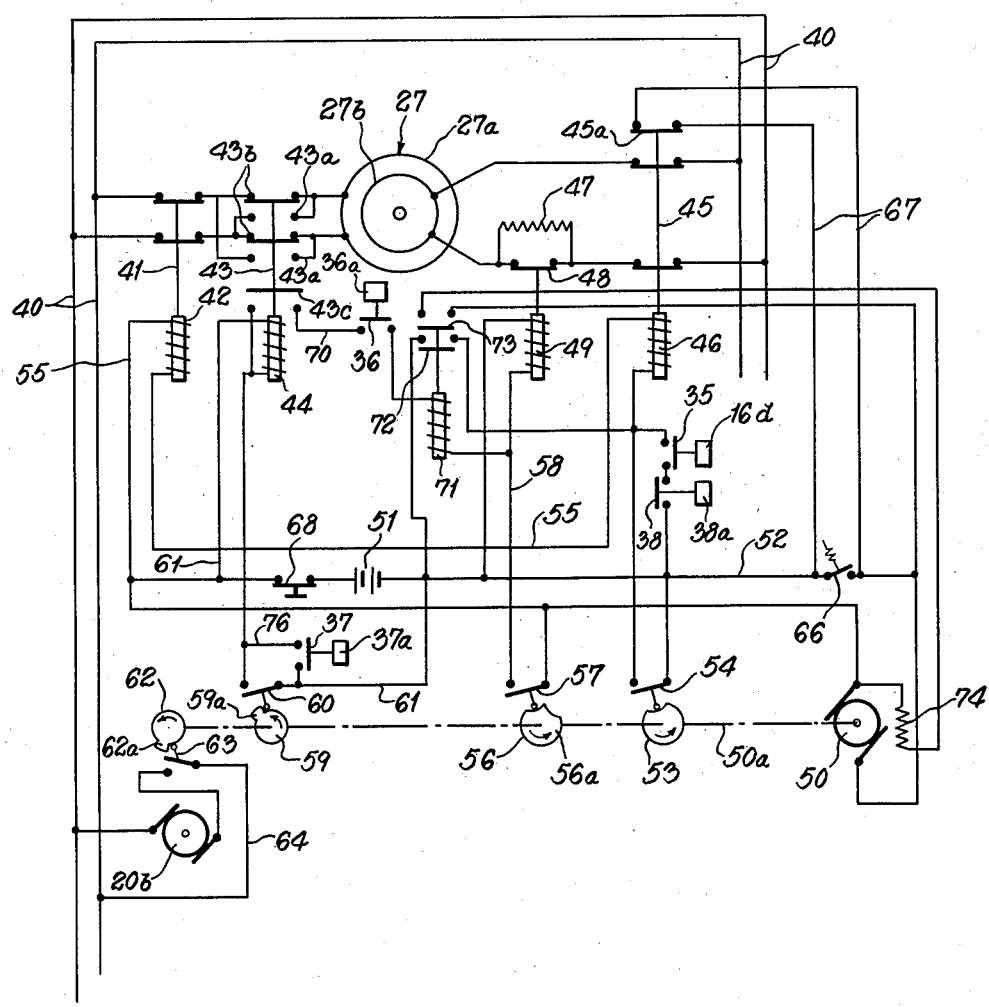

United States Patent Office 2,906,466
Patented Sept. 29, 1959

2,906,466

SYSTEM FOR EXTRACTING LIQUID FROM SOLIDS, SUCH AS METAL CHIPS

Allen O. Hopper, South Orange, N.J., assignor to Turbine Equipment Company, New York, N.Y., a corporation of New Jersey Application February 24, 1955, Serial No. 490,311

18 Claims. (Cl. 241—34)

This invention relates to systems for extracting liquids from solids, for example, for extracting cooling or cutting compounds, such as oil, from metal turnings or chips by conveying them in a crushed condition to and from a centrifugal extractor for removing the oil. The invention has particular reference to an automatic system of this type having novel control means for guarding against the adverse effects of irregular conditions which may occur in the system during automatic operation.

The present application is a continuation-in-part of my copending application Serial No. 224,736 filed May 5, 1951, now Patent No. 2,731,151, dated January 17, 1956, relating to an automatic system of the above-mentioned type. The system there disclosed comprises a pair of separate conveyor pipes of the pneumatic type, one a feed pipe and the other a discharge pipe. The pipes are connected to suitable blowers for forcing air through the pipes to convey metal chips. The oil-soaked chips are first fed to a crusher to reduce them to small size. The crushed chips then pass to a hopper which feeds a device for introducing the chips into the pneumatic feed pipe, where they are conveyed by the air draft into a surge bin near the centrifugal extractor. This bin serves as a hopper for accumulating a supply of chips and delivering them intermittently into the extractor rotor by way of a feeding device, which may be operated in any suitable manner to start and stop the feed to the rotor. The extractor has separate outlets for the chips and the extracted oil, respectively, the relatively dry chips being discharged through the bottom of the rotor into a surge hopper leading to a device for introducing the chips into the pneumatic discharge pipe. The latter conveys the chips to a suitable storage site or directly to a vehicle for removing them from the plant.

The extractor operation is controlled automatically, as by means of a timing device for starting and stopping the different phases of each cycle. The cycle is begun by driving the rotor at low speed while operating the extractor feeding device, so that the chips entering the rotor are held by centrifugal force against the perforated wall of the rotor. When the rotor loading period is completed, the operation of the feeding device is interrupted and the rotor is accelerated to its normal operating speed. During the rotation of the rotor at its relatively high operating speed, the oil is removed from the chips by centrifugal force and passes through the perforated wall into a collecting channel surrounding the rotor and leading to the oil outlet of the extractor. After a suitable period of centrifuging at the relatively high speed, the driving of the rotor is interrupted and a braking action is applied to it. When the speed of the rotor becomes so low that the centrifugal force will not hold the chips against the wall, they fall automatically through the bottom opening into the surge hopper leading to the pneumatic discharge pipe. The next cycle is then initiated by feeding a new batch of chips to the extractor rotor while driving it at low speed.

In the automatic operation of such a system, any one or more of the following conditions may occur:

(1) The pneumatic discharge pipe may become clogged, resulting in an overflow of chips at the device which introduces them into this pipe from the extractor discharge hopper, and possibly causing damage to this device.

(2) The extractor discharge hopper may become too full to accommodate another load of chips discharged from the rotor, as by occurrence of condition 1. This may result in damage to the extractor.

(3) The extractor rotor may become unbalanced due to uneven distribution of chips therein during the loading period, as by the occurrence of condition 2. This, too, may cause damage to the extractor, particularly during the subsequent high speed extracting operation.

(4) A new cycle of the extractor may be initiated before the load of chips previously centrifuged therein has been completely discharged from the rotor. As a result, the rotor cannot receive its full complement of wet chips for the new cycle, or the rotor will be overloaded in the new cycle.

(5) The hopper from which the extractor is fed may have an insufficient supply of wet chips to constitute a full load for the rotor, as by reason of a stoppage or sub-normal flow of chips in the pneumatic feed pipe. To recycle the extractor with only a partial load would be uneconomical.

(6) The feed hopper for the extractor may become overloaded with wet chips, as through an interruption of the operation of the extractor and its feeding device. This could result in a stoppage in the pneumatic feed pipe, with overflowing of wet chips at (and possible damage to) the device which introduces the chips into this pipe from the crusher discharge hopper.

(7) The crusher discharge hopper may become overloaded with wet chips, as by occurrence of condition 6, so that overflow of chips and possible damage to the affected parts of the system might result.

The present invention has for its principal object the provision of system of the character described having control means for automatically guarding against the adverse effects of the above-mentioned conditions, or any of them.

A preferred form of the new system will now be described by reference to the accompanying drawings, in which Fig. 1 is a schematic view of the system, showing some of the control circuitry;

Fig. 2 is a side elevational view, partly in section, of the centrifugal extractor, and Fig. 3 is a diagrammatic view of the remainder of the control circuitry for the system as illustrated in Fig. 1.

In the following, the extractor system of the present invention will be described specifically in connection with the extracting of cutting oil from metal chips, although it will be apparent that the system is applicable to the extraction of liquids from solids, generally.

The system as illustrated comprises a conveyor 6 for delivering the chips to a crusher feed hopper 7 from any convenient supply point (not shown). The conveyor 6 is shown as having an endless feed belt 6a driven at the discharge end of the conveyor by a roller 6b mounted on a transverse shaft 6c. The shaft 6c is driven from an electric motor 8 through a belt connection 8a. An energizing circuit 9 for this motor includes a current source 9a, a manually operable switch 9b, an overload switch 11b associated with crusher motor 11a, and a control switch 9c which is operable automatically, as will be described presently.

The wet chips are delivered into the crusher feed hopper 7 from the discharge end 6d of the conveyor 6.

The hopper 7 is vented at 7a and opens at the bottom into a crusher 11, which may be of any conventional type, preferably the rotary type, driven by the motor 11a. Once in the crusher, the chips fall by gravity to the space between the usual grates and the crushing ring or hammers, where they are broken into small pieces approximately an inch or less in size, enabling them to fall through the grate openings into an underlying surge hopper 12. This hopper opens at the bottom into a feeder 13 of the screw type. At a certain distance above the feeder 13, the hopper 12 is provided with a level-responsive device 12a connected to the switch 9c. The device 12a may be of any conventional type which is actuated when the level of the chips in hopper 12 reaches a certain height, such as a diaphragm operated by the pressure of the chips when they reach a level near the top of hopper 12. The switch 9c is normally closed, but if the level of the chips in hopper 12 should rise to a point near the top of this hopper, the level-responsive device 12a is actuated and opens the switch 9c, thereby deenergizing the circuit 9 and stopping the conveyor 6 for crusher 11. When the chip level in hopper 12 falls below the control device 12a, the switch 9c is re-closed by this device and the operation of conveyor 6 for crusher 11 resumes. If the crusher motor becomes overloaded, the switch 11b (which may be operated by a relay in series with motor 11a) opens the circuit of the conveyor motor 11a to prevent further feeding of the crusher, until switch 11b re-closes upon correction of the overload condition.

The feeder 13 contains a conveyor screw 13a on a shaft 13b driven by an electric motor 13c. The crushed chips from hopper 12 fall into one end portion of the feeder 13, where they are picked up by the screw 13a and conveyed to a bottom outlet 13d at the other end. The chips fall through outlet 13d into a device 14 for introducing the chips into a pneumatic feed pipe 15, through which an air draft is forced by a blower 15a. The device 14 may be an air lock of any conventional type, or it may be a funnel through which the chips are fed by gravity into pipe 15 at a low pressure region provided by a nozzle, as disclosed in my copending application Serial No. 224,736, now Patent No. 2,731,151, dated January 17, 1956. It will be understood that the device 14 serves to prevent "blowback" of the chips to atmosphere from the air stream in pipe 15, which may be at a positive pressure of 3 to 5 lbs. per square inch, for example.

The chips are conveyed pneumatically through the feed pipe 15 to a surge bin 16 mounted on the floor F. The pipe 15 leads upward through the floor into the top portion of the bin 16. By reason of the finely divided form of the chips, the air draft in the feed pipe 15 will convey the chips through the pipe at high velocity, that is, at a velocity in the order of 5000 ft. per minute. The air discharges from the bin through a top outlet 16a.

Near its upper portion, the hopper 16 has two level-responsive devices 16b and 16c located one above the other, these devices being similar to the level-responsive device 12a. The devices 16b and 16c are arranged to control an electrical circuit 18 for energizing the electric motor 13c. The circuit 18 includes a current source 18a, a manually operable switch 18b, a switch 18c connected to a pressure-responsive device 15b in the pneumatic feed pipe 15, a switch 18d connected to the upper level-responsive device 16c, and a relay switch 18e. The pressure-responsive switch 18c is normally closed and is opened by its control device 15b only when the air pressure in pipe 15 rises above a predetermined value, as due to a partial plugging or stoppage in this pipe. Opening of switch 18c stops the feed motor 13c and thereby interrupts the supply of crushed chips to feed pipe 15. When the air pressure in pipe 15 decreases to its normal range upon correction of the faulty condition, the pressure-responsive device 15b re-closes switch 18c so that the screw feeder 13 can resume operation.

The switches 18d and 18e in circuit 18 are also normally closed. Switch 18e is operated by a relay circuit which includes a normally open switch 19a connected to the lower level-responsive device 16b, a current source 19b, a normally open switch 19c connected to the upper level-responsive device 16c, a relay 19d adapted when energized to open the switch 18e, and a holding switch 19e adapted to be closed to a holding position upon energizing of relay 19d. Whenever the level of chips in the surge bin or hopper 16 rises sufficiently to actuate the level-responsive device 16b, the latter closes switch 19a; but this does not affect the motor circuit 18 because the switches 18d and 18e remain closed and relay 19d remains deenergized due to the open condition of switch 19c. However, if the chip level continues to increase sufficiently to act upon the upper level-responsive device 16c, the latter opens the motor circuit 18 at switch 18d so as to stop the feeder 13, and also closes switch 19c so as to energize the relay 19d through switches 19c and 19a. As a result, the motor circuit 18 is also opened at relay switch 18e, and the other relay switch 19e is closed to establish a holding circuit for relay 19d through the lower level-responsive switch 19a. Consequently, when the upper level-responsive device 16c re-closes switch 18d and re-opens switch 19c upon falling of the chip level in hopper 16, the relay 19d remains energized through the closed switches 19a and 19e, and the motor circuit 18 remains deenergized by the open switch 18e. When the chip level falls sufficiently to re-open switch 19a through operation of the lower level responsive device 16b, the holding circuit for relay 19d is broken and the relay switches 18e and 19e return to their normal positions so as to reenergize the motor circuit 18, whereby the operation of feeder 13 is resumed.

At its lower portion, the surge hopper 16 has a level-responsive device 16d which, through means which will be described presently, operates to maintain a minimum level of chips in this hopper.

The surge hopper 16 has a bottom outlet which opens into one end portion of a feeder 20 containing a conveyor screw 20a driven by an electric motor 20b. The chips from hopper 16 are picked up by the screw 20a and fed to the opposite end portion of feeder 20, from which they drop through a bottom outlet 20c into a centrifugal extractor 21.

The extractor 21 comprises a base B mounted in a pit P (in which the crusher 11 is also mounted) and supporting a frame 22, which, in turn, supports a rotor housing 23 by means of brackets 23a (Fig. 2). At the top of the frame is a head 24 in which a vertical drive shaft 25 is mounted for rotation. The shaft 25 extends downward into the housing 23, where it supports and drives a rotor or centrifugal basket 26 (Fig. 2). The housing and basket have aligned top openings 23b and 26a, respectively, surrounding the shaft 25 and through which the chips fall from the feeder 20. Below these openings, the shaft carries axially-spaced horizontal discs 25a, 25b and 25c which are of progressively increasing diameter, the lowermost disc 25c having the greatest diameter. These discs serve to deflect the chips outward against the perforated cylindrical wall of the basket 26, and to distribute the chips evenly in the axial direction of the basket. Below the cylindrical wall, the basket has a frusto-conical portion 26b, likewise perforated, the lower or reduced end of which is open, as shown at 26c. This reduced end is surrounded by a trough 23c at the bottom of the stationary housing. From the bottom of the trough, a discharge pipe 23d (Fig. 1) forms a separate outlet for the oil or other liquid separated from the chips, the pipe 23d leading downward to a suitable collecting tank (not shown). The basket 26 is connected to a hub 25d on shaft 25, by means of circumferentially spaced radial members 26d extending from the hub to the conical or bottom portion 26b of the basket. The basket is rotated within the housing 23 by an electric motor 27 driving the shaft 25 through a belt or other connection 28.

At the first part of each operating cycle, the basket 26 is driven by the motor 27 at relatively low speed, as, for example, at the speeds incident to acceleration from zero to 450 r.p.m. After this period, the feeder 20 is operated through its motor 20b to load the basket, the centrifugal force being sufficient to hold the chips against the basket wall above the conical portion 26b and cause a substantially even distribution of the chips around the inside of the basket. After a predetermined loading period, the feeder motor 20b is stopped and the basket is accelerated to its full operating speed, for example, 900 r.p.m., at which speed it is driven for a sufficient time to extract substantially all of the oil from the chips. This oil passes under centrifugal force through the perforations in the basket and against the stationary wall of the surrounding housing 23, where it collects in the trough 23c and discharges through pipe 23d. At the end of the extracting period, the driving of the basket is interrupted and a braking action applied (as described in more detail hereinafter). Thus, the chips fall automatically through the bottom opening 26c when the centrifugal force becomes insufficient to hold them against the basket wall.

The chips discharged from the centrifugal basket fall through the bottom of housing 23 into a surge hopper 30, which opens at the bottom into one end portion of a feeder 31 having a conveyor screw 31a driven by an electric motor 31b. At its opposite end portion, the feeder 31 has a bottom outlet 31c for the chips picked up by the conveyor screw 31a. The chips fall through outlet 31c into a device 32 for introducing the chips into a pneumatic discharge pipe 33, which may be provided with a separate blower (not shown) similar to the blower 15a. The device 32 may be an air lock or other suitable means for preventing "blowback" of the chips to atmosphere from the air stream in pipe 33, and it may be identical to the device 14 connected to the pneumatic feed pipe 15. In the pipe 33, the dry chips are delivered by the air draft to the desired destination (not shown), such as a storage space or a vehicle for removing them from the site.

The feeder motor 31b has an energizing circuit 34 which includes a current source 34a, a manually operable switch 34b and an automatically operated switch 34c connected to a pressure-responsive device 33a in the pneumatic discharge pipe 33. The latter device, which is similar to the pressure-responsive device 15b, may be of the conventional type having a bellows or diaphragm connected to switch 34c and operable to open this switch when the pressure in pipe 33 exceeds a predetermined value, as due to a partial plugging or stoppage in this pipe. The opening of switch 34c deenergizes motor 31b and thereby stops the feed to the device 32 and pipe 33, until the pressure in pipe 33 drops to its normal range so as to re-close switch 34c through operation of the pressure-responsive device 33a.

The centrifugal extractor 21 and its feeder 20 are operated by means to be described presently, which are under control of a normally closed switch 35 operated by the level-responsive device 16d in feed hopper 16, a zero-speed switch 36 which opens only when the extractor basket 26 comes to a full stop, a basket unbalance switch 37 which closes only in response to excessive lateral movements of shaft 25 due to unbalance of the basket 26, and a normally closed level-responsive switch 38 at the upper part of the extractor discharge hopper 30.

Referring now to the control circuits illustrated in Fig. 3, the stator winding 27a of the extractor motor 27 is energized from a power line 40 through a normally open switch 41. This switch is adapted to be closed by energizing of a relay 42. A "reversing" switch 43 is connected in circuit with the stator winding and its energizing switch 41, the switch 43 being operated by a relay 44. When the relay 44 is deenergized, the switch 43 engages a lower set of contacts 43a so that current passes through the stator winding in one direction. However, when the relay 44 is energized, the switch 43 moves into engagement with the upper contacts 43b so as to reverse the direction of the current through the stator winding 27a. In this way, a regenerative braking action is applied to the motor, thereby reducing the time required to decelerate the centrifugal basket 26 to the speed at which the chips will discharge through the bottom opening.

The rotor winding 27b of the extractor motor is energized from the power line 40 through a normally open switch 45, which is adapted to be closed by a relay 46. A resistor 47 is included in the rotor circuit but is adapted to be shunted by a normally open switch 48 which is closed upon energizing of a relay 49. Thus, when the relay 49 is deenergized, the motor 27 can operate only at relatively low speed due to the added resistance 47 in the rotor circuit, but when the relay 49 is energized to cut out the resistor 47, the motor can operate at its full speed.

A constant speed electric motor 50 is adapted to be energized by a current source 51 in a circuit 52. This motor drives a cam shaft 50a for controlling the extractor 21 and its feeder 20. Each complete revolution of the cam shaft 50a causes a complete cycle of the extractor. A cam 53 on this shaft controls a switch 54 for connecting the relays 42 and 46 in series across the current source 51, through the wiring 55. A second cam 56 controls a switch 57 for connecting the relay 49 across the current source 51, through wiring 58. A third cam 59 controls a switch 60 for connecting the relay 44 across the current source 51 through wiring 61. A cam 62 controls a switch 63 for connecting the feeder motor 20b to the power line 40, through wiring 64. At the start of the revolution of cam shaft 50a, the cam 53 closes switch 54 to operate relays 42 and 46 and thereby energize the motor windings 27a—27b. However, the cams 56 and 59 allow their respective switches 57 and 60 to remain open, whereby the resistor 47 causes the extractor motor to accelerate only to its relatively low speed, and the regenerative or braking switch 43 is held inoperative. At the same time (or shortly thereafter), the cam 62 closes switch 63 to energize the feeder motor 20b. This causes chips to be fed into the centrifugal basket 26 during the time in which it is accelerated to the relatively low speed permitted by the resistor 47, this period of time constituting a loading period. The loading period is terminated when the high portion 62a of cam 62 disengages the switch 63 and allows it to open, thereby stopping the feeder motor 20b. At the same time, the high portion 56a of cam 56 engages and closes the switch 57 to energize the relay 49, thereby closing switch 48 and cutting out the resistor 47. The extractor motor 27 then accelerates to its full operating speed, at which it is held during the centrifugal extracting period. The extracting period is terminated when the high portion 59a of cam 59 engages and closes the switch 60 to energize relay 44, thereby operating the regenerative switch 43 and imposing a braking action on the basket by reversing the direction of current through the stator winding 27a. This initiates a decelerating period, at the end of which the chips fall through the bottom opening of the basket into the surge hopper 30. The deceleration period and the complete cycle are terminated when the cams reach the starting positions illustrated in Fig. 3, wherein the cams 53, 56 and 59 permit their respective switches 54, 57 and 60 to open and deenergize the relays 46—42, 49 and 44, respectively.

The above-described cycle is initiated by closing a starting switch 66 to complete the circuit 52. When the starting switch is released, the circuit 52 remains energized by a holding circuit 67 including a switch 45a which is operated with the switch 45 under control of relay 46. At the end of the complete cycle, when cam 53 allows its switch 54 to open, the relay 46 is deenergized and opens holding switch 45a so as to deenergize the cam motor 50, except under circumstances which will be described presently. In case it is desired to stop the operation of the extractor before completion of a cycle, a normally closed safety switch 68 may be opened to deenergize the circuit 52 and the relays 42—46.

In a typical operation of the system, the cams 56 and 62 provide a loading period of about 30–60 seconds, during which the extractor motor and basket accelerate to a relatively low speed of 450 r.p.m.; the cams 56 and 59 provide an extracting period of approximately 2 minutes, during which the motor and basket accelerate to a full speed of 900 r.p.m. and are held at that speed; and the cam 59 provides a braking or decelerating period of about forty seconds, making a total of about four minutes for the complete cycle. By using cams of different contours, the durations of the various operating periods may be changed as desired.

It will be apparent that the timing mechanism 50—53, 56, 59 and 62, and the associated switches, form a control means operatively connected to the feeding device 20 and rotor 26, for operating this feeding device only during rotation of the rotor at relatively low speed. They also form a means connected to the feeding device 20 and the speed-limiting device 47 of the extractor motor, for rendering these devices inoperative substantially simultaneously, so that the extractor feed is interrupted and the extractor rotor accelerates to its full operating speed. The "reversing" switch 43 constitutes a means for decelerating the extractor rotor 26 from its full operating speed, under control of the timing mechanism.

As shown in Fig. 3, the cam switch 54 is adapted to be short-circuited by the level-responsive switches 35 and 38, which are connected in series across the cam switch 54. The level-responsive device 16d (Fig. 1) holds its switch 35 closed as long as the chip level in the extractor feed hopper 16 is not below the minimum level necessary to supply a full load to the extractor basket 26. The level-responsive device 38a (Fig. 1) holds its switch 38 closed as long as the chip level in the extractor discharge hopper 30 does not exceed a maximum level, beyond which the latter hopper cannot safely accommodate more than the load currently in the extractor. Consequently, if the chip level is not too low in feed hopper 16 and is not too high in discharge hopper 30 when the extractor 21 completes its cycle as previously described, the relay 46 will remain energized through the level-responsive switches 35 and 38 upon opening of cam switch 54. As a result, the cam motor 50 will continue its rotation so as to reclose the cam switch 54 and effect another cycle of the extractor and its feeding device 20. Thus, the extractor and its feeding device will recycle again and again as long as the level-responsive switches 35 and 38 are closed throughout each open period of cam switch 54.

On the other hand, if the chip level should become too low in feed hopper 16 or too high in discharge hopper 30, the switch 35 or 38 will be opened by its level-responsive device 16d or 38a, respectively, so that a new cycle of extractor 20 is prevented by opening of cam switch 54. In other words, if either of the level-responsive switches 35—38 should open before completion of an extractor cycle, the cycle will nevertheless be completed due to continued energizing of relay 46 by cam switch 54; but when the latter switch opens at completion of the cycle, the relay 46 and motor 50 are deenergized and further cycling is prevented (unless the condition which caused switch 35 or 38 to open has been remedied prior to opening of cam switch 54). It will be observed that opening of either of the level-responsive switches 35—38 at any time during an open period of cam switch 54 will prevent further recycling of the extractor, by causing the holding switch 45a to open through deenergizing of relay 46.

This automatic discontinuance of the extractor recycling indicates that the system requires attention. Upon correction of the condition which caused the opening of switch 35 or 38, the automatic operation of the extractor may be resumed by closing the starting switch 66.

To avoid reloading of the extractor while part of a previous load remains in it, I provide a means for preventing recycling of the extractor until its rotor has come to a full stop at the end of the deceleration period, so that the chips will be completely discharged by gravity. As shown in Fig. 3, such means comprise a holding circuit 70 for the regenerative braking relay 44. This holding circuit extends from the positive side of current source 51 through wire 61, relay 44, holding switch 43c which is closed upon energizing of relay 44, zero speed switch 36 which is closed as long as the rotor shaft 25 is rotating, relay 71, and relay 49 to the negative side of the current source. Thus, if the cam switch 60 opens before the extractor rotor has been decelerated to a complete stop (or practically so), the braking relay 44 will nevertheless remain energized through zero speed switch 36 in the holding circuit 70, and relay 49 will also remain energized to give the maximum braking effect. The zero speed switch 36 is operated by any conventional device 36a connected to the rotor shaft 25 and adapted to open the switch 36 only when this shaft is stationary (or substantially so). Thus, the parts 36—36a constitute a speed-responsive device connected to the rotor 26 and operable thereby between a first position (switch 36 closed) in which the rotor is rotating and a second position (switch 36 open) in which the rotor is substantially stationary.

The relay 71, when energized by the holding circuit 70, closes a holding switch 72 for relays 46 and 42, the switch 72 being connected across the cam switch 54. At the same time, the relay 71 closes a switch 73 for stopping the cam motor 50. The switch 73 may be connected across the motor 50 so as to merely short circuit the latter, but as shown this switch is adapted when closed to energize a braking device 74 for stopping the motor 50. Since the cam motor 50 is stopped as long as the brake holding circuit 70 is energized, recycling of the extractor 21 is prevented while the relay 44 continues to hold the reversing switch 43 in position to brake the extractor, the other relays 42, 46 and 49 being held energized at the same time through relay 71 and its switch 72.

When the extractor rotor comes to a stop to permit complete discharge of the chips by gravity into the discharge hopper 30, the zero speed switch 36 is opened so as to break the holding circuit 70 (still assuming that cam switch 60 has opened prior to opening of switch 36). As a result, the switch 43 returns to its forward position due to deenergizing of braking relay 44, and relays 49 and 71 are deenergized. Thus, the motor 50 will resume its operation to recycle the extractor, provided that the level-responsive switches 35—38 are still closed so as to maintain relays 46 and 42 energized.

It will be apparent that as long as the extractor rotor comes to a stop during the normal braking period provided by cam 59 (so that zero speed switch 36 is opened during this period), the brake holding circuit 70 will not be energized. The extractor will then be recycled in the normal manner upon opening of cam switches 60 and 54, provided that the level-responsive switches 35—38 are both closed during the open period of cam switch 54.

The unbalance switch 37 is normally open and is closed only in response to excessive lateral deviation of the rotor shaft 25, as due to rotation of the extractor basket 26 while it is unevenly loaded. Upon such deviation of the rotor shaft from its normal position, this shaft engages the switch member 37a and thereby closes the unbalance switch 37. As shown in Fig. 3, switch 37 is connected by a shunt line 76 across the cam switch 60 of braking relay 44. Accordingly, closing of unbalance switch 37 immediately energizes relay 44 and applies regenerative braking to the extractor by operating the reversing switch 43. This braking effect will be maintained until the extractor rotor comes to a complete stop, even though the closing of unbalance switch 37 is only momentary. That is, once the braking relay 44 is energized through switch 37, it will remain energized through the holding circuit 70 until the extractor rotor comes to a stop and opens the zero speed switch 36. The switch 37 thus provides a basket unbalance control which automatically applies a braking action whenever the extractor basket runs out of normal balance (if the basket is not already in the braking part of the cycle), this braking action being maintained until the basket comes to a stop so as to permit complete discharge of the chip load.

As will be understood from the foregoing, the parts 40—52 and 55—67 form with the level-responsive switches 35—38 a control means operatively connected to the extractor 21 and its feeding device 20 for cycling and recycling them through stages of loading, accelerating and decelerating the rotor 26, since the recycling is effected automatically as long as the switches 35—38 remain closed throughout the open periods of cam switch 54. The latter switch and its cam 53 constitute a means operatively connected to such control means and responsive to operation of either of the level responsive devices 16d and 38a for preventing recycling only at completion of a cycle, since opening of either of the switches 35 and 38 by its level responsive device will deenergize relay 46 only upon opening of cam switch 54 at the end of a cycle. The holding circuit 70 for the relays 42—44—46—49 (which also stops the cam motor 50) forms a means operatively connecting the zero-speed-responsive element 36—36a to the control means, for preventing recycling while the latter element is in the position in which it is held during rotation of rotor 26. The shunt line 76 constitutes a means operatively connecting the unbalance-responsive element 37—37a to the control means and responsive to a predetermined lateral deviation of the rotor for interrupting a cycle and decelerating the rotor. Thus, because of these various means associated with the control means, (1) the extractor 21 and its feeding device 20 are automatically prevented from recycling if at completion of any cycle the level in feed hopper 16 is too low to provide a full extractor load or the level in discharge hopper 30 is too high to receive the next load discharged from the extractor; (2) the recycling of the extractor and its feeding device is automatically delayed if the rotor has not substantially stopped at the end of the normal decelerating stage provided by cam 59; and (3) excessive lateral deviation of the rotor at any time will automatically interrupt the cycle and apply regenerative braking to the rotor until it comes to a substantial stop.

In the event that the chips accumulate to an excessive level in the feed hopper 16 (as due to interrupting of the continuous operation of the extractor through occurrence of any of the conditions previously described), the feeder 13 which supplied this hopper through pneumatic conveyor 15 is automatically rendered inoperative by means of the parts 19—19e operatively connected to feeder 13 and responsive to operation of the level responsive device 16b—16c, as previously described. Similarly, the feeder 13 will be automatically stopped in response to clogging of the pneumatic conveyor 15, by means of the pressure-responsive parts 15b—18c operatively connected to this feeder through the circuit 18. Whenever the chip level in the crusher discharge hopper 12 becomes too high (as due to stopping of the feeder 13), the conveyor 6 for feeding the crusher is automatically stopped by means of the level responsive device 9c—12a operatively connected to the latter conveyor. As in the case of the pneumatic feed conveyor 15, any clogging of the pneumatic discharge conveyor 33 will automatically stop its feeder 31 by means of the pressure-responsive device 33a—34c operatively connected to this feeder.

It will be apparent, therefore, that any overloading or clogging of the discharge line from the extractor or the feed line to the extractor will automatically result in a counter-action at a preceding part of the system, so as to prevent damage to the affected part or provide an opportunity for the adverse condition to correct itself. For example, if the discharge line 33 becomes clogged, its feeder 31 will be rendered inoperative; and if this condition persists long enough for the extractor discharge hopper 30 to acquire too high a level of chips, the extractor operation will be terminated at the end of the current cycle until the condition is corrected. The resulting build-up of the chip level in the extractor feed hopper 16 will eventually stop the feeder 13 which supplies this hopper through conveyor 15; and the resulting build-up of the chip level in the crusher discharge hopper 12 will eventually stop the conveyor 6 which feeds the crusher. On the other hand, overloading of the extractor feed hopper 16, for example, due to any cause unrelated to the extractor operation, will result in a corrective action without affecting the operation of the extractor and its discharge line; and overloading of the crusher discharge hopper 12, due to any cause unrelated to the feeder 13, will result in corrective action without affecting the operation of this feeder or the parts of the system beyond it.

The zero speed switch 36, as mentioned, may be of any desired type which operates automatically when the extractor rotor comes to a stop, an example of such a switch being one sold by Walworth Controls Company of Rocky Hill, Conn., and identified as "No. 1020 Dazic Switch." The various level-responsive switches may be of the type sold by Fuller Company of Catasauqua, Pa., and identified as "Model SG-4 Indicator."

While I have disclosed pneumatic conveyors 15 and 33 for supplying the extractor feed hopper 16 and removing chips from the system (and such conveyors are preferred in some installations), other types of conveyors may be used in their place without affecting the automatic operation of the extractor as described.

I claim:

1. A system for treating solids mixed with a liquid to be extracted therefrom, which comprises a crusher for crushing the solids, a crusher discharge hopper positioned to receive the crushed solids, a pneumatic conveyor, means including a feeder for delivering said solids and liquid from said hopper to the pneumatic conveyor, an extractor feed hopper to which said conveyor leads from said delivering means, a centrifugal extractor having a hollow rotor provided with separate outlet for solids and extracted liquid, respectively, a feeding device for feeding said solids and liquid into the extractor rotor from said feed hopper, an extractor discharge hopper for receiving solids from said solids outlet of the extractor rotor, a second pneumatic conveyor, a second delivering means including a feeder for delivering solids from said last hopper to said second conveyor, means operatively connected to said last feeder and responsive to clogging of said second conveyor for rendering said last feeder inoperative, a first level-responsive device operatively connected to said feeding device and responsive to a predetermined high level of solids in the extractor discharge hopper for rendering said feeding device inoperative, and a second level-responsive device operatively connected to said first feeder and responsive to a predetermined high level of solids in the extractor feed hopper for rendering said first feeder inoperative.

2. A system according to claim 1, comprising also means operatively connected to said first feeder and responsive to clogging of said first conveyor for rendering said first feeder inoperative.

3. A system according to claim 1, comprising also a conveyor for feeding solids to the crusher, and a level-responsive device operatively connected to said last conveyor and responsive to a predetermined high level of solids in the crusher discharge hopper for rendering said last conveyor inoperative.

4. A system according to claim 1, comprising also control means operatively connected to the extractor and its feeding device for cycling and recycling the same through stages of loading, accelerating, and decelerating the rotor, and means operatively connected to said control means and responsive to operation of said first level-responsive device for preventing said recycling.

5. A system according to claim 1, comprising also control means operatively connected to the extractor and its feeding device for cycling and recycling the same through stages of loading, accelerating, and decelerating the rotor, a third level-responsive device operable in response to a predetermined low level of solids in the extractor feed hopper, and means operatively connected to said control means and responsive to operation of either of said first and third level-responsive devices for preventing said recycling.

6. A system according to claim 1, comprising also control means operatively connected to the extractor and its feeding device for cycling and recycling the same through stages of loading, accelerating, and decelerating the rotor, a speed-responsive element connected to the rotor and operable thereby between a first position in which the rotor is rotating and a second position in which the rotor is substantially stationary, and means operatively connecting said element to the control means for preventing said recycling while said element is in its first position.

7. A system according to claim 1, comprising also control means operatively connected to the extractor and its feeding device for cycling and recycling the same through stages of loading, accelerating, and decelerating the rotor, an unbalance-responsive element operable in response to a predetermined lateral deviation of the rotor from its normal rotating position, and means operatively connecting said element to the control means and responsive to said deviation for decelerating the rotor at any part of a cycle.

8. In a system including a centrifugal extractor having a hollow rotor provided with an outlet for solids and a separate outlet for extracted liquid, a device for feeding a mixture of solids and liquid into the rotor, and a discharge hopper to which the solids are discharged from said solids outlet while the rotor is substantially stationary, the combination of control means operatively connected to the extractor and its feeding device for cycling and recycling the same through stages of loading, accelerating, and decelerating the rotor, a speed-responsive element connected to the rotor and operable thereby between a first position in which the rotor is rotating and a second position in which the rotor is substantially stationary, and means operatively connecting said element to the control means for preventing said recycling while said element is in its first position.

9. In a system including a centrifugal extractor having a hollow rotor provided with an outlet for solids and a separate outlet for extracted liquid, a device for feeding a mixture of solids and liquid into the rotor, and a discharge hopper to which the solids are discharged from said solids outlet while the rotor is substantially stationary, the combination of control means operatively connected to the extractor and its feeding device for cycling and recycling the same through stages of loading, accelerating, and decelerating the rotor, an unbalance-responsive element operable in response to a predetermined lateral deviation of the rotor from its normal rotating position, and means operatively connecting said element to the control means and responsive to said deviation for interrupting said cycling and decelerating the rotor.

10. In a system including a centrifugal extractor having a hollow rotor provided with an outlet for solids and a separate outlet for extracted liquid, a device for feeding a mixture of solids and liquid into the rotor, and a discharge hopper to which the solids are discharged from said solids outlet while the rotor is substantially stationary, the combination of control means operatively connected to the extractor and its feeding device for cycling and recycling the same through stages of loading, accelerating, and decelerating the rotor, a level-responsive device operable in response to a predetermined high level of solids in said hopper, and means operatively connected to the control means and responsive to said operation of the level-responsive device for preventing said recycling.

11. The combination according to claim 10, in which said means for preventing the recycling is responsive to said operation of the level-responsive device only at completion of a cycle.

12. In a system including a centrifugal extractor having a hollow rotor provided with separate outlets for solids and extracted liquid, respectively, an extractor feed hopper, and a device for feeding a mixture of solids and liquid into the extractor rotor from said feed hopper, the combination of control means operatively connected to the extractor and its feeding device for cycling and recycling the same through stages of loading, accelerating, and decelerating the rotor, a level-responsive device operable in response to a predetermined low level of solids in said feed hopper, and means operatively connected to said control means and responsive to said operation of the level-responsive device for preventing said recycling.

13. The combination according to claim 12, in which said means for preventing the recycling is responsive to said operation of the level-responsive device only at completion of a cycle.

14. In a system including a centrifugal extractor having a hollow rotor provided with separate outlets for solids and extracted liquid, respectively, an extractor feed hopper, a device for feeding a mixture of solids and liquid into the extractor rotor from said feed hopper, and a discharge hopper to which the solids are discharged from the rotor after deceleration thereof, the combination of control means operatively connected to the extractor and its feeding device for cycling and recycling the same through stages of loading, accelerating, and decelerating the rotor, a level-responsive device operable in response to a predetermined low level of solids in said feed hopper, a second level-responsive device operable in response to a predetermined high level of solids in said discharge hopper, and means operatively connected to said control means and responsive to said operation of either level-responsive device for preventing said recycling.

15. The combination according to claim 14, in which said means for preventing the recycling is responsive to said operation of either level-responsive device only at completion of a cycle.

16. In a system including a centrifugal extractor having a hollow rotor provided with separate outlets for intermittent discharge of solids and extracted liquid, respectively, an extractor feed hopper for intermittently supplying the rotor with a mixture of solids and liquid, a conveyor leading to said hopper, and means including a feeder for delivering said mixture to the conveyor, the combination of a level-responsive device operable in response to a predetermined high level of solids in the feed hopper, means operatively connected to said feeder and responsive to said operation of the level-responsive device for rendering the feeder inoperative, and a device operatively connected to said feeder and responsive to clogging of said conveyor for rendering the feeder inoperative.

17. The combination according to claim 16, comprising also a crusher having a discharge hopper for supplying said feeder, a conveyor for feeding solids to the crusher, and means responsive to a predetermined high level of solids in said last hopper for rendering said last conveyor inoperative.

18. The combination according to claim 16, comprising also a crusher having a discharge hopper for supplying said feeder, a conveyor for feeding solids to the crusher, the crusher including a motor, and means responsive to overloading of the crusher motor for rendering said last conveyor inoperative.

References Cited in the file of this patent

UNITED STATES PATENTS

| | | |
|---|---|---|
| 61,463 | Robertson | Jan. 22, 1867 |
| 548,377 | Lovett | Oct. 22, 1895 |
| 618,814 | Darby | Jan. 31, 1899 |
| 1,413,934 | Ramsey et al. | Apr. 25, 1922 |
| 1,620,531 | Fisher | Mar. 8, 1927 |
| 1,839,941 | Zelezniak | Jan. 5, 1932 |
| 1,873,394 | Hallam | Aug. 23, 1932 |
| 2,130,864 | Steps | Sept. 20, 1938 |
| 2,371,956 | Dees | Mar. 20, 1945 |
| 2,381,505 | Lindholm | Aug. 7, 1945 |
| 2,396,622 | Tholl | Mar. 12, 1946 |
| 2,424,746 | Downes | July 29, 1947 |
| 2,510,163 | Wood | June 6, 1950 |